(12) United States Patent
Kato (10) Patent No.: US 6,674,243 B2
(45) Date of Patent: Jan. 6, 2004

(54) EL DRIVING CIRCUIT, CONTROL METHOD AND ELECTRONIC APPARATUS

(75) Inventor: Kazuo Kato, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 10/187,563

(22) Filed: Jul. 2, 2002

(65) Prior Publication Data

US 2003/0071575 A1 Apr. 17, 2003

(30) Foreign Application Priority Data

Jul. 6, 2001 (JP) ........................................ 2001-206049
Apr. 3, 2002 (JP) ........................................ 2002-101310

(51) Int. Cl.[7] .............................. G09G 3/10; G09G 3/30
(52) U.S. Cl. ...................................... 315/169.3; 345/76
(58) Field of Search ........................... 315/169.1, 169.3, 315/224, 222, 211; 345/76, 204, 211

(56) References Cited

U.S. PATENT DOCUMENTS

| | | | | |
|---|---|---|---|---|
| 5,027,036 A | * | 6/1991 | Ikarashi et al. .......... | 315/169.3 |
| 5,519,288 A | * | 5/1996 | Tatsumi et al. .......... | 315/169.3 |
| 5,559,402 A | * | 9/1996 | Corrigan, III ............ | 315/169.3 |
| 6,072,477 A | * | 6/2000 | Ueno ........................ | 345/211 |

* cited by examiner

Primary Examiner—Don Wong
Assistant Examiner—Minh D A
(74) Attorney, Agent, or Firm—Adams & Wilks (57) ABSTRACT

To provide an EL driving circuit, a control method and an electronic apparatus for suppressing counter electromotive force of a coil generated by rapid voltage fluctuation in case of turning off an EL element. In the IC chip, main circuits such as an oscillating circuit, flip-flops as a dividing circuit and a switched H-bridge circuit are provided. The oscillating circuit is connected to a capacitor through PIN and connected to the flip-flop inside the IC chip. The oscillating circuit generates a high frequency clock and outputs the clock to the flip-flop. The flip-flop outputs its output to the flip-flop and one of input terminals of an AND circuit. The flip-flop divides the clock outputted from the flip-flop by 16 to generate a lower frequency clock. The flip-flop makes the two low frequency clocks in reversal phase each other to output them to one of input terminals of an AND circuit and one of input terminals of an AND circuit respectively. The switched H-bridge circuit is constituted by main elements such as AND circuits, transistors, diodes and thyristors.

9 Claims, 9 Drawing Sheets

EL DRIVING CIRCUIT, CONTROL METHOD AND ELECTRONIC APPARATUS

BACKGROUND OF THE INVENTION

1. Field of the Invention

The present invention relates to an EL driving circuit, a control method and an apparatus more particularly to those having an electroluminescent element.

2. Description of the Prior Art

Figure 6:
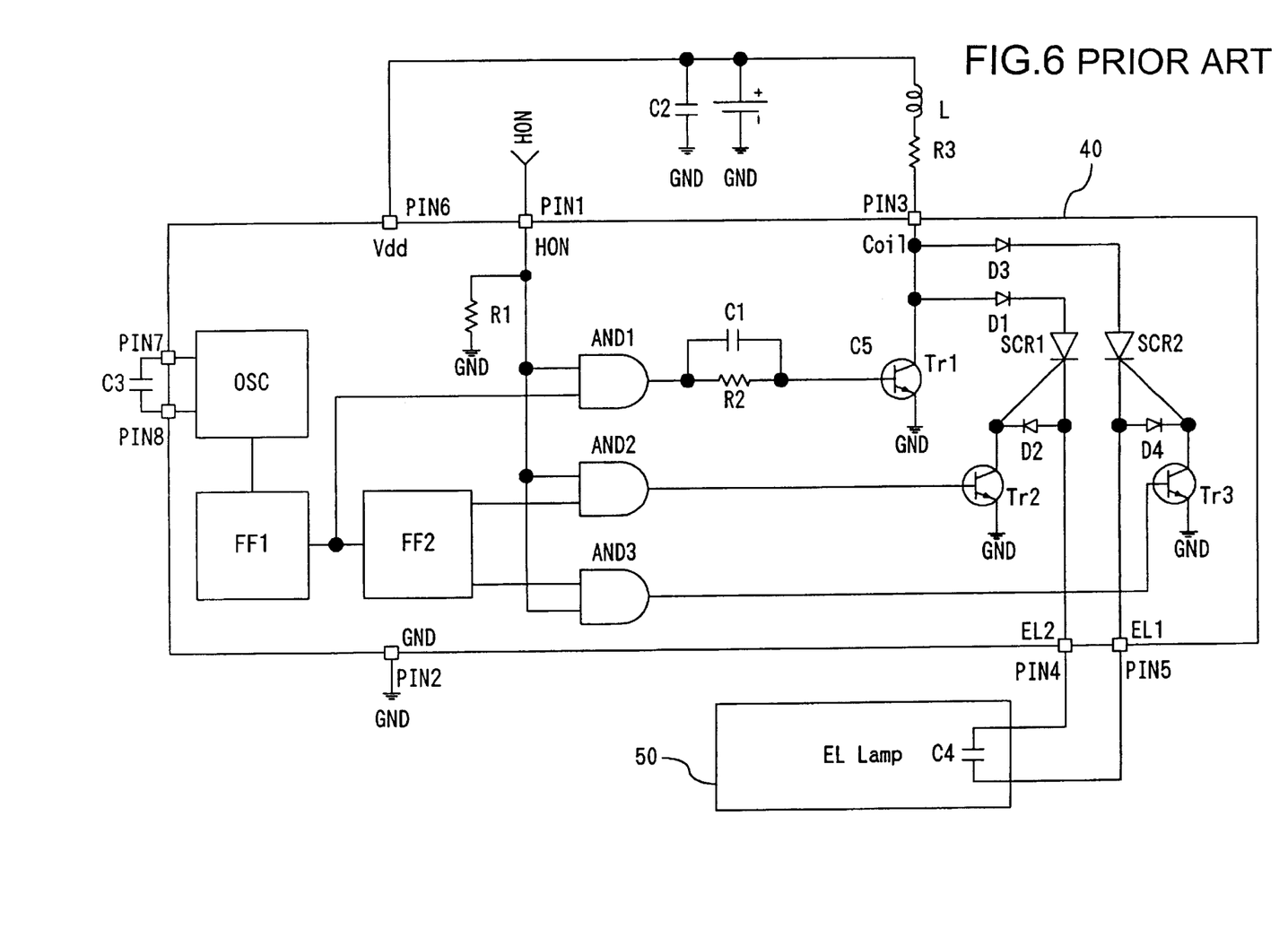
FIG. 6 is a circuit diagram of a conventional EL driving circuit.

FIG. 6 is a circuit diagram of a conventional EL driving circuit. The EL driving circuit is arranged that an IC chip 40 applies voltage, which is supplied through a coil L and a resister R3 by a control signal Hon from a microcomputer to be not shown, to an EL element 50 to drive (Refer to U.S. Pat. No. 4,527,096).

In the IC chip 40, main circuits such as an oscillating circuit OSC, flip-flops FF1 and FF2 as a dividing circuit and a switched H-bridge circuit are provided. Terminals (PAD) of PIN 1 to 8 connecting to each circuit are also provided in the IC chip 40.

The oscillating circuit OSC is connected to a capacitor C3 through the PIN 7 and PIN8, and connected to the flip-flop FF1 in the IC chip 40. The oscillating circuit OSC generates a high frequency clock and outputs the clock to the flip-flop FF1.

The flip-flop FF1 outputs its output to the flip-flop FF2 and one of input terminals of an AND circuit 1 described below (hereinafter referred to as "AND1").

The flip-flop FF2 generates a low frequency clock of which the clock outputted from the flip-flop FF1 is divided by16. The flip-flop FF2 outputs its output, as two low frequency clocks in reversal phase each other to output them to one of input terminals of an AND circuit 2 described below (hereinafter referred to as "AND2") and one of input terminals of an AND circuit 3 described below (hereinafter referred to as "AND3") respectively.

The switched H-bridge circuit is constituted by main elements such as ANDs 1, 2 and 3, transistors Tr1, 2 and 3, diodes 1 to 4 and thyristors SCR1 and 2, and those elements are connected as described below.

Each one of input terminals of the ANDs 1, 2 and 3 is connected to the PIN1 respectively. The control signal Hon from the microcomputer not to be shown is connected to the PIN1

The PIN6 is a power supply terminal Vdd of the IC chip 40 and connected to a positive electrode vdd of a power supply such as a battery and the like. The PIN2 is a power supply terminal GND of the IC chip 40 and connected to a negative electrode of the power supply such as the battery and the like. The PIN2 and PIN6 are connected to Vdd and GND in an inner circuit of the IC to supply electric power respectively. A capacitor C2 is located outside the IC and connected to the PIN2 and PIN6 to operate as an electrolytic compensating capacitor.

Wiring between the other input terminals of ANDs 1,2, and 3 and the PIN1 is connected to a pull-down resister R1 connected to the GND. An output of the AND1 is connected to a base of the transistor Tr1 through a capacitor C1 and a resistor R2 which are connected in parallel. An output of the AND2 is connected to a base of the transistor Tr2, and an output of the AND3 is connected to a base of the transistor Tr3.

A collector of the transistor Tr1 is connected to the PIN3. Between the PIN3 and the positive electrode Vdd of the power supply, the voltage set-up coil outside the IC is connected, strictly the resister R3 and the coil L are connected in series. Anodes of the diodes D1 and D3 are connected to wiring between the transistor Tr1 and the PIN3.

A cathode of the diode D1 is connected to an anode of the thyristor SCR1. An gate of the thyristor SCR1 is connected to a collector of the transistor Tr2. A cathode of the thyristor SCR1 is connected to the PIN4 and an anode of the diode D2. A cathode of the diode D2, like the gate of the thyristor SCR1, is connected to the collector of the transistor Tr2.

A cathode of the diode D3 is connected to an anode of the thyristor SCR2. A gate of the thyristor SCR2 is connected to a collector side of the transistor Tr3. A cathode of the thyristor SCR2 is connected to the PIN5 and an anode of the diode D4. A cathode of the diode D4, like the gate of the thyristor SCR2, is connected to the collector of the transistor Tr3.

Emitters of the transistors Tr1, Tr2 and Tr3 are connected to the GND respectively. The PIN4 and PIN5 are connected to a capacitor C4 which is an equivalent circuit of the EL element 50.

Operation of above described configuration of the EL driving circuit is explained below. When the EL turns on, the microcomputer not to be shown switches the signal Hon from a low state to a high state. The signal is inputted to one of inputs of the AND1, AND2 and AND3 through the PIN1 respectively.

At this point, when the higher frequency clock signal generated by the oscillating circuit OSC is inputted to the other input terminal of the AND1 through the flip-flop FF1, the transistor Tr1 performs switching operation responsive to the clock. The transistor Tr1 applies pulsating voltage to the diodes D1 and D3 through the coil L and the resister R3 by the switching operation.

On the other hand, inputting the lower frequency clock from the flip-flop FF2 causes the AND2 and AND3 to output the high state alternately, which causes the transistors Tr2 and Tr3 to perform the switching operation alternately.

When output from the AND2 exists in the base of the transistor Tr2, the transistor Tr2 turns on, the thyristor SCR1 turns off, and the PIN4 becomes almost equivalent electric potential as the GND through the diode D2. At this point, the transistor Tr3 is turned off. Electric charge is being accumulated in the capacitor C4 through the diode D3 and the thyristor SCR2 by the pulsating voltage. In this way, voltage generating in the capacitor C4 is gradually approaching a saturation state.

When output from the flip-flop FF2 is inversed, the transistor Tr2 turns off and the transistor Tr3 turns on. At this point, the thyristor SCR2 turns off, and the PIN5 becomes almost equivalent electric potential as the GND through the diode D4. The electric charge is being accumulated in the capacitor C4 through the diode Dl and the thyristor SCR1 by the pulsating voltage. The voltage generating in the capacitor C4 is gradually approaching a saturation state.

As described above, polarity of voltage applied to the capacitor C4 is switched alternately and the voltage is continuously supplied to the capacitor C4, which permits high voltage to be supplied to the EL element 50.

Figure 7:
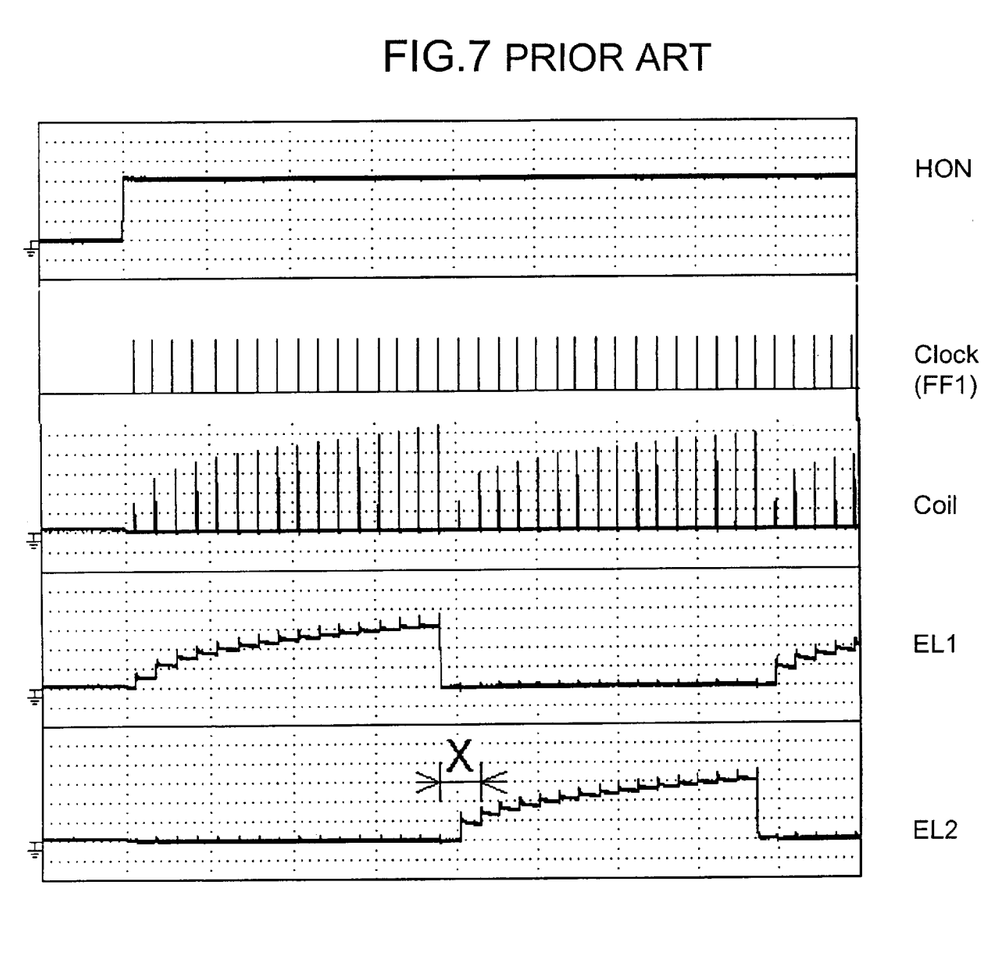
FIG. 7 is a timing chart of a conventional EL driving circuit.

FIG. 7 is a timing chart of an EL driving circuit. The timing chart shows timing of relationship between voltage and time. When the signal Hon inputted from the PIN1 to the IC chip 40 is turned on, the timing chart shows appearance that, in case that the clock (CLOCK) outputted from the oscillating circuit OSC to the flip-flop FF1 is supplied to the switched H-bridge circuit, responsive to the clock from the flip-flop FF2 not to be shown in FIG. 7, voltage (EL1) of the PIN5 and voltage (EL2) of the PIN4 are alternately set-upped to be supplied to the capacitor C4.

However, in the above described conventional EL driving circuit, when the EL element is turned off, the microcomputer switches the signal Hon from a high state to a low state at the timing (duration X shown in FIG. 7) when the polarity of the voltage applied to the capacitor of the EL device is reversed, which causes the transistor (Tr1) to be turned off, thus creating the counter electromotive force Vcoil1 in the PIN3. A problem is that, when the Vcoil1 exceeds a rating Vces of the transistor (Tr1), the transistor (Tr1) to be turned off turns on, which causes noise such as power supply fluctuation and the like to be created.

Particularly, the noise is created from the coil as electromagnetic wave, the microcomputer is sometimes reset by error due to the electromagnetic wave, consequently there exerts a problem that the noise causes operation of the microcomputer to be unstable. For example, there exists a problem that, in case where the microcomputer includes time function, time is reset by the noise to become 00:00.

In the meantime, it was found by the present inventors that, by analyzing the conventional EL driving circuit, difference in the Vces of the transistor (Tr1) due to the unevenness of the IC chip brought about by mass production causes the above described creation of the noise by operation of the transistor (Tr1).

Generally, the Vces is a characteristic of collector to emitter maximum voltage in a transistor and represented by a characteristic curve between collector current Ic and collector-emitter voltage Vce.

That is to say, it is found that, in the conventional EL driving circuit, when the rating Vces of the transistor (Tr1) is lower than a design value, the counter electromotive force created in the coil at the timing of turning off the EL element as described above exceeds a voltage of the rating Vces of the transistor (Tr1), which causes the transistor (Tr1) to be turned on by error due to the counter electromotive force to create the noise from the coil (L).

Figure 8:
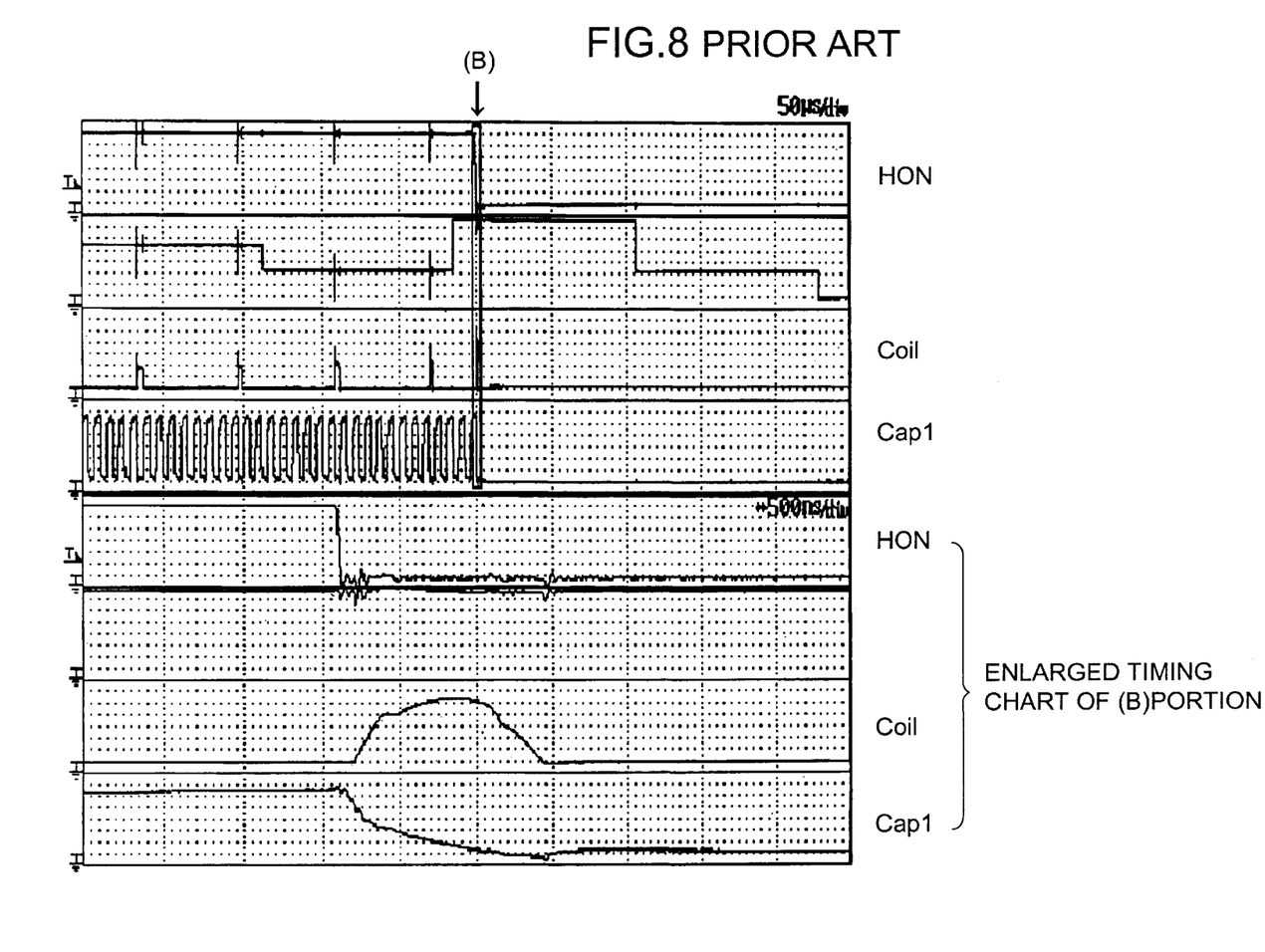
FIG. 8 is a timing chart in case that a rating Vces of a transistor (Tr1) is higher than a design value.
Figure 9:
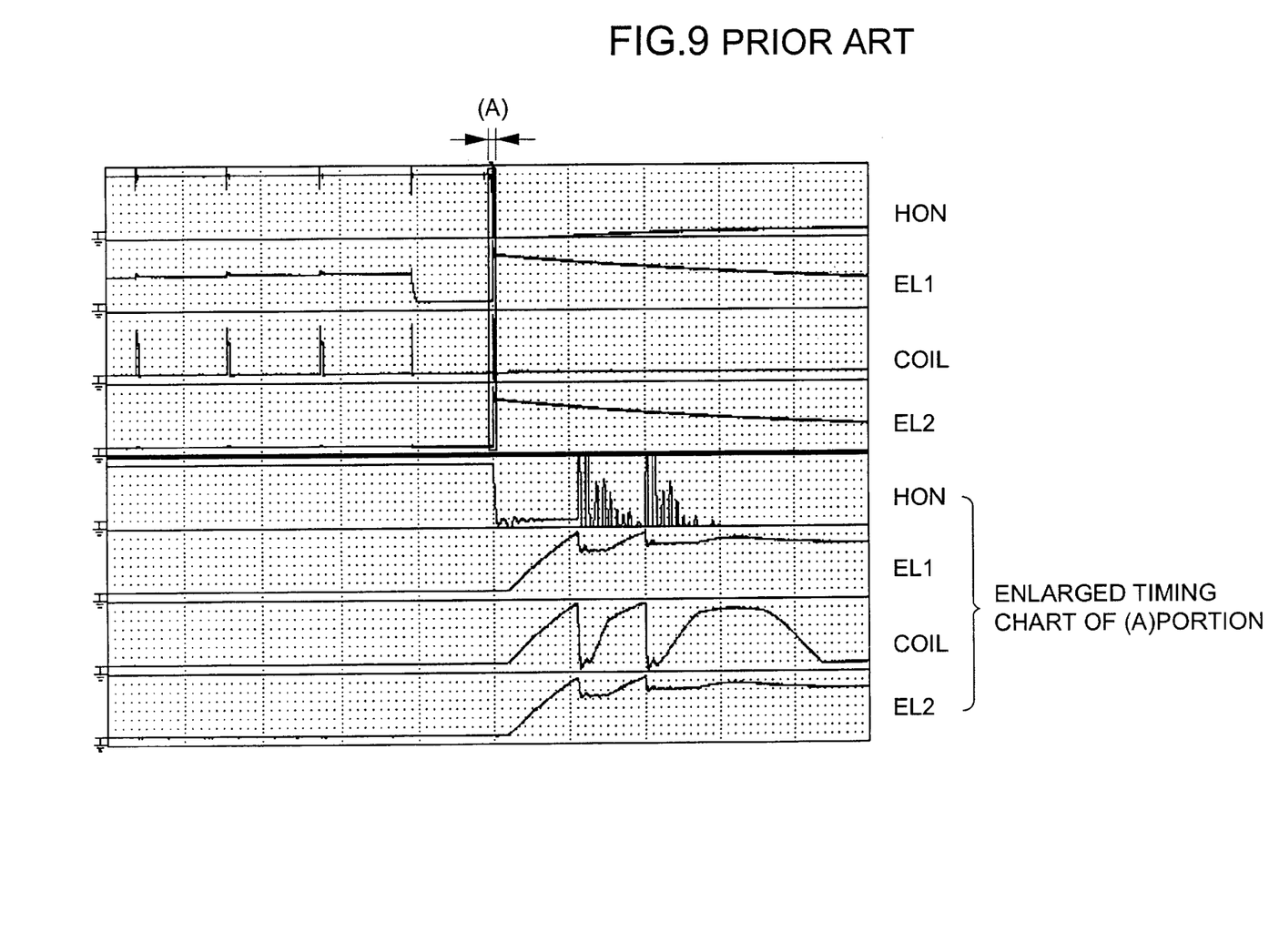
FIG. 9 is a timing chart in case that the rating Vces of a transistor (Tr1) is lower than a design value.

FIG. 8 is a timing chart in case that the rating Vces of the transistor (Tr1) is higher than the design value. FIG. 9 is a timing chart in case that the rating Vces of the transistor (Tr1) is lower than the design value.

As shown in FIG. 8, in case that the rating Vces is higher than the design value, when the signal Hon which directs turning off the EL element falls, a waveform of the counter electromotive force generated from the coil becomes a single-angled form.

On the other hand, in case that the rating Vces is lower than the design value, when the signal Hon which directs turning off the EL element falls, the counter electromotive force generated from the coil rises from 0V, and avalanche breakdown occurs when the counter electromotive force exceeds the rating Vces. As a result, as shown in FIG. 9, a waveform of the PIN3 becomes a plurality of the waveforms of saw-tooth and angled forms. The saw-tooth wave creates the noise, which makes the operation of the microcomputer unstable. Spike noise to be seen in the signal Hon is created through a measuring equipment by noise in PIN3.

In accordance with the foregoing, it is a purpose of the invention to provide an EL driving circuit suppressing the counter electromotive force of the coil generated in case of turning off the EL element to eliminate creation of the noise from the coil by the avalanche breakdown, and thereby preventing the error of the microcomputer due to the noise.

SUMMARY OF THE INVENTION

In order to accomplish the purpose described above, an EL driving circuit according to the invention comprises an EL element, a voltage set-up coil which generates pulsating voltage for turning on the EL element, an oscillating circuit for generating a reference signal, a dividing circuit for dividing a clock generated by the oscillating circuit into at least two kinds of frequency clocks, a first switching circuit for switching current through the voltage set-up coil by the higher frequency clock of the two kinds of frequency clocks divided by the dividing circuit, a second switching circuit for switching polarity of voltage applied to the EL element by the lower frequency clock of the two kinds of frequency clocks divided by the dividing circuit, a control circuit for switching connection between the dividing circuit and the first switching circuit, and connection between the dividing circuit and the second switching circuit at the same time by a control signal which turns on and off the EL element, and a suppressing circuit for suppressing counter electromotive force created in case of turning off the EL element lower than the withstanding voltage of the first switching circuit.

The suppressing circuit enables the counter electromotive force generated in case of turning off the EL element to be lower than the withstanding voltage of the first switching circuit. The EL element may be made of either inorganic EL materials or organic EL materials.

Consequently even in the same period of time as the conventional case that voltage generated in case of turning off the EL element is higher than the rating Vces, the voltage of the coil L can be suppressed below the rating Vces by the suppressing circuit. As a result, error of the microcomputer can be prevented.

Another EL driving circuit is that the suppressing circuit includes a first delay circuit constituted by a combination of a resistor and a capacitor, and the first delay circuit is arranged at a forestep of the control circuit, in case that the control signal turning off the EL element is inputted to the first delay circuit, input voltage of the first delay circuit is switched from a high state to an open state.

This causes a signal which controls turning on and off the EL element to be relaxed by the first delay circuit to be outputted to the control circuit.

Consequently, even in the same period of time as the conventional case that voltage generated in case of turning off the EL element is higher than the rating Vces, the voltage of the coil L can be suppressed below the rating Vces by the delay circuit. As a result, error of the microcomputer can be prevented.

Another EL driving circuit is that the suppressing circuit includes a resistor connected in parallel to the voltage set-up coil and suppresses the counter electromotive force in case of turning off the EL element.

Accordingly, in case of turning off the EL element, because pulsating voltage generated in case of turning off the switching transistor is consumed as Joule heat by the resistor, electromagnetic wave oscillated from the voltage set-up coil can be reduced. As a result, the error of the microcomputer due to the electromagnetic wave generated in case of turning off the switching transistor can be prevented.

Another EL driving circuit is that the suppressing circuit includes a second delay circuit constituted by a combination of a resistor, a capacitor and a third switching circuit, and in the second delay circuit, the third switching circuit turns on in case of turning off the EL element.

Accordingly, fluctuation of voltage supplied to a base of the first switching transistor can be made gentle by a resistor and a capacitor, which causes change of current through the coil L to become small even in the same period of time as the conventional case that the voltage generated in case of turning off the EL element is higher than the rating Vces. This permits voltage of the coil L to be suppressed below the rating Vces. As a result, error of the microcomputer can be prevented.

It is desirable that a third switching element for switching the capacitor is provided, the switching element is turned on in case of turning off the EL element and electric charge is charged by voltage applied to a gate of a third switching transistor.

Another EL driving circuit is that a signal generating circuit for generating a signal which controls turning on and of f the EL element is provided, and the signal generating circuit generates the control signal which turns on and off the EL element. And the invention is also that a control method comprises steps of generating a control signal which changes a high state to an open state for turning off the EL element, inputting the control signal to a delay circuit and decreasing the voltage of the delay circuit from the high state according to a time constant, generating an irregular pulse by the control circuit when the decreasing voltage of the delay circuit reaches to certain a voltage to threshold voltage of the control circuit, and releasing energy stored in a voltage set-up coil by a first switching element which turns on or off current through the voltage set-up coil responsive to the irregular pulse.

Accordingly, when the control signal is inputted to the delay circuit, the voltage of the delay circuit decreases from the high state according to the time constant and reaches a certain voltage for the threshold voltage of the control circuit, then the control circuit generates the irregular pulse and the first switching element turns on or off current flowing through the voltage set-up coil, which permits energy stored in the voltage set-up coil to release.

At this point, the time constant of the delay circuit is not lower than 10 microseconds and not more than 1 millisecond.

Even in the same period of time as the conventional case that voltage generated in case of turning off the EL device is higher than the rating Vces, the voltage of the coil L can be suppressed below the rating Vces because energy stored in the voltage set-up coil is released. As a result, error of the microcomputer can be prevented.

The invention is also that a control method comprises steps of generating a control signal which changes a high state to an open state for turning off the EL element, starting delay operation by turning on a switch of the delay circuit when the control signal is inputted to the delay circuit, outputting a low signal to the delay circuit by the control circuit when the control signal is inputted to the control circuit, outputting a signal decreased according to the time constant of the delay circuit when the low signal is inputted to the delay circuit, and decreasing current through the voltage set-up coil responsive to the signal by the first switching circuit when the signal is inputted to the first switching circuit.

Accordingly, fluctuation of voltage supplied to a base of the switching transistor can be made gentle by a resistor and a capacitor, which causes change of current through the coil L to become small even in the same period of time as the conventional case that voltage generated in case of turning off the EL element is higher than the rating Vces. This permits voltage of the coil L to be suppressed below the rating Vces. As a result, error of the microcomputer can be prevented.

The invention also relates to an electronic apparatus that comprises a power supply and the EL driving circuit driven by electric power from the power supply. The electronic apparatus includes a timepiece, a display, an electronic calculator, a mobile phone, an audio hardware, a computer of handheld type, a PDA (Personal Digital Assistance), and so on.

BRIEF DESCRIPTION OF THE SEVERAL VIEWS OF THE DRAWINGS

A preferred form of the present invention is illustrated in the accompanying drawings in which.

DETAILED DESCRIPTION OF THE PREFERRED EMBODIMENTS

The invention will be described in detail below with reference to accompanying drawings. The invention is not limited to the modes for carrying out the invention.

EXAMPLE 1

Figure 1:
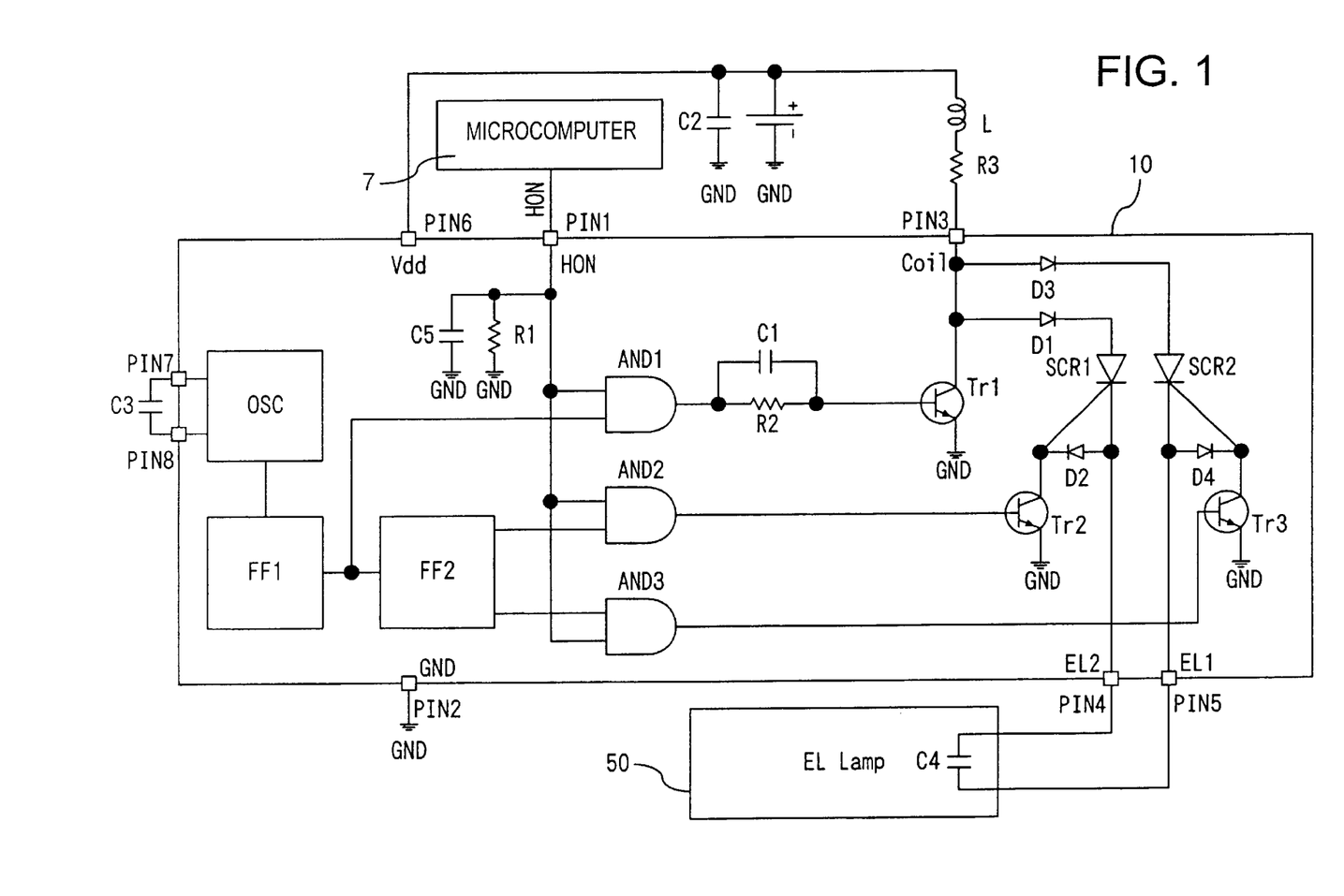
FIG. 1 is a circuit diagram of an EL driving circuit of Example 1 according to the invention.

FIG. 1 is a circuit diagram of an EL driving circuit of Example 1 for carrying out the invention. The EL driving circuit is arranged that an IC chip 10 applies voltage supplied through a coil L and a resister R3 by a control signal Hon from a microcomputer 7, which generates a signal for controlling to turn on and off an EL device, to the EL element 50 to drive. In explanation below, the same numerical labels and signs are indicated to explain in the same case as the conventional configuration.

In the IC chip 10, main circuits such as an oscillating circuit OSC, flip-flop FF1 and FF2 as a dividing circuit and switched H-bridge circuit are provided. And the IC chip 10 is provided with terminals (PAD) PINs 1 to 8 connected to each circuit.

The oscillating circuit OSC is connected to a capacitor C3 through the PIN7 and PIN8 and connected to the flip-flop FF1 inside the IC chip 10. The oscillating circuit OSC generates a high frequency clock and outputs the clock to flip-flop FF1.

The flip-flop FF1 outputs its output to the flip-flop FF2 and one of input terminals of an AND circuit 1 described below (hereinafter referred to as "AND1").

The flip-flop FF2 divides the clock outputted from the flip-flop FF1 by 16 to generate a lower frequency clock. The flip-flop FF2 makes the two low frequency clocks in reversal phase each other to output them to one of input terminals of an AND circuit 2 described below (hereinafter referred to as "AND2") and one of input terminals of an AND circuit 3 described below (hereinafter referred to as "AND3") respectively.

The switched H-bridge circuit is constituted by main elements such as ANDs 1, 2 and 3, transistors Tr1, Tr2 and Tr3, diodes D1 to D4 and thyristors SCR1 and SCR2, and those elements are connected as described below.

The other input terminals of the ANDs 1, 2 and 3 are connected to the PIN1 respectively. PIN1 is connected to the control signal Hon from the microcomputer 7.

The PIN6 is a power supply terminal Vdd of the IC chip 10 and connected to a positive electrode Vdd of a power supply such as a battery and the like. The PIN2 is a power supply terminal GND of the IC chip 10 and connected to a negative electrode of the power supply such as the battery and the like. The PIN2 and PIN6 are connected to Vdd and GND in an inner circuit of the IC to supply electric power respectively. The capacitor C2 is located outside the IC and connected to the PIN2 and PIN6 to operate as an electrolytic compensating capacitor.

Wiring between the other input terminals of ANDs 1,2, and 3 and the PIN1 is connected to a resister R1 and a capacitor C5, which are connected in parallel and constitute a delay circuit, connected to the GND. The resistor R1 and the capacitor C5 relaxes response of voltage of the signal Hon inputted from the PIN1 in case of turning off the EL element.

On the other hand, an output of the AND1 is connected to a base of the transistor Tr1 through a capacitor C1 and a resistor R2. The capacitor C1 and the resistor R2 are connected in parallel. An output of the AND2 is connected to a base of the transistor Tr2, and an output of the AND3 is connected to a base of the transistor Tr3.

A collector of the transistor Tr1 is connected to the PIN3. The resister R3 and the coil L are connected in series between the PIN3 and the positive electrode Vdd of the power supply outside the IC. Anodes of the diodes D1 and D3 are connected to wiring between the transistor Tr1 and the PIN3.

A cathode of the diode D1 is connected to an anode of the thyristor SCR1. An gate of the thyristor SCR1 is connected to a collector of the transistor Tr2. A cathode of the thyristor SCR1 is connected to the PIN4 and an anode of the diode D2. A cathode of the diode D2, like the gate of the thyristor SCR1, is connected to the collector of the transistor Tr2.

A cathode of the diode D3 is connected to an anode of the thyristor SCR2. A gate of the thyristor SCR2 is connected to a collector side of the transistor Tr3. A cathode of the thyristor SCR2 is connected to the PIN5 and an anode of the diode D4. A cathode of the diode D4, like the gate of the thyristor SCR2, is connected to the collector of the transistor Tr3.

Emitters of the transistors Tr1, Tr2 and Tr3 are connected to the GND respectively. And the PIN4 and PIN5 are connected to a capacitor C4 which is a equivalent circuit of the EL element 50.

Operation in case of turning off an EL light of above described configuration of the EL driving circuit according to Example 1 of the invention is explained below.

When the EL light turns on, the signal Hon is switched a low state to a high state by the microcomputer 7. The signal is inputted to one of inputs of ANDs 1, 2 and 3 through the PIN1 respectively. On the point, certain electric charge is charged in the capacitor C5. Operation of steps from turning on the EL light is omitted because there is little difference from the conventional case.

In case that the EL light is turned on, when the microcomputer 7 switches the signal Hon from a high state to an open state, the microcomputer 7 deenergizes voltage of the signal Hon supplied from the PIN1 and at the same time the electric charge stored in the capacitor C5 is discharged through the resistor R1, which causes reduction of the voltage of the signal Hon to become gently.

Figure 2:
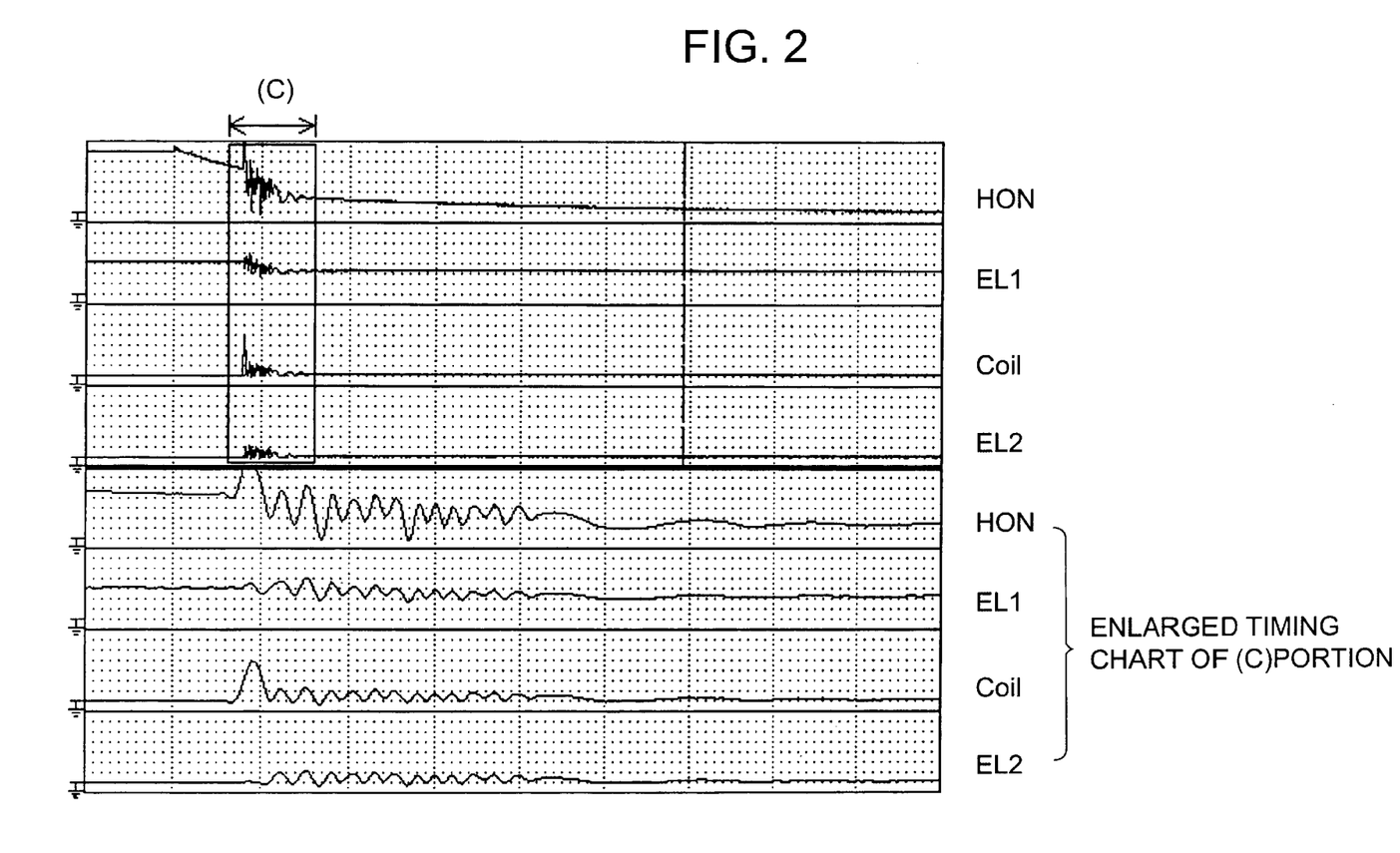
FIG. 2 is a timing chart of an EL driving circuit of Example 1 according to the invention.
Figure 3:
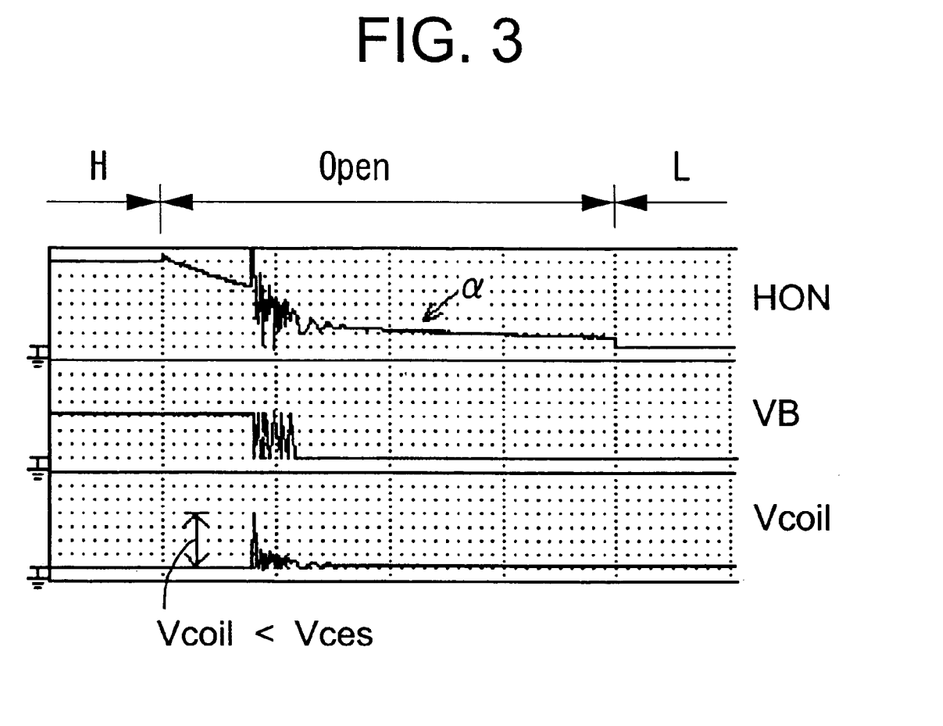
FIG. 3 is a timing chart of an EL driving circuit of Example 1 according to the invention.

FIG. 2 and FIG. 3 are timing charts of the EL driving circuit of Example 1 for carrying out the invention. The timing charts show the timing of a relationship between voltage and time. The timing charts show appearance in a case that the signal Hon inputted from the PIN1 to the IC chip 10 is switched from a high state to an open state.

The voltage of the signal Hon descends gently like a curve a with little fluctuation by the resistor R3 and the capacitor C5. When the voltage of the signal Hon reaches around the threshold voltage of the AND1, the AND1 chatters to output an irregular pulse. The transistor Tr1 responsive to the irregular pulse performs switching to release energy stored in the coil. After that, when the signal Hon becomes a low state, the AND1 outputs low and the transistor Tr1 turns off completely.

Consequently, the counter electromotive force of high voltage generated in a conventional case is not generated. This causes fluctuation of the counter electromotive force generated in the coil L to be small. As a result, the counter electromotive force does not exceed the rating Vces of the transistor Tr1.

In case of turning off the EL element, because voltage applied to one of inputs of the AND1 is gently reduced according to the time constant ($\tau = R1 \times C5$) by the resistor R1 and the capacitor C5, the response of voltage of the signal Hon inputted from PIN1 is relaxed. When the AND1 chatters to output the irregular pulse, the transistor Tr1 performs switching responsive to the pulse to release energy stored in the coil.

Consequently, according to the above described Example 1 for carrying out the invention, creation of the counter electromotive force above the rating Vces, which is generated in the same case of turning off the EL device as the conventional case, can be suppressed. This permits voltage of the PIN3 to be suppressed below the rating Vces. As a result, error of the microcomputer can be prevented.

However the time constant $\tau$ is about 40 microseconds in examples of FIG. 2 and FIG. 3, a lower limit of the time constant based on experiments is 1 microsecond. In consideration of the unevenness of semiconductor process, a difference in individual, operating temperature range, battery voltage fluctuation range and so on, it is desirable that the lower limit of the time constant ô is 10 or more microseconds. It is sufficient that a higher limit of the time constant ôis 1 or less millisecond, in consideration of penetration current during relaxation of the signal Hon, error by electrostatic noise from outside and so on.

EXAMPLE 2

Figure 4:
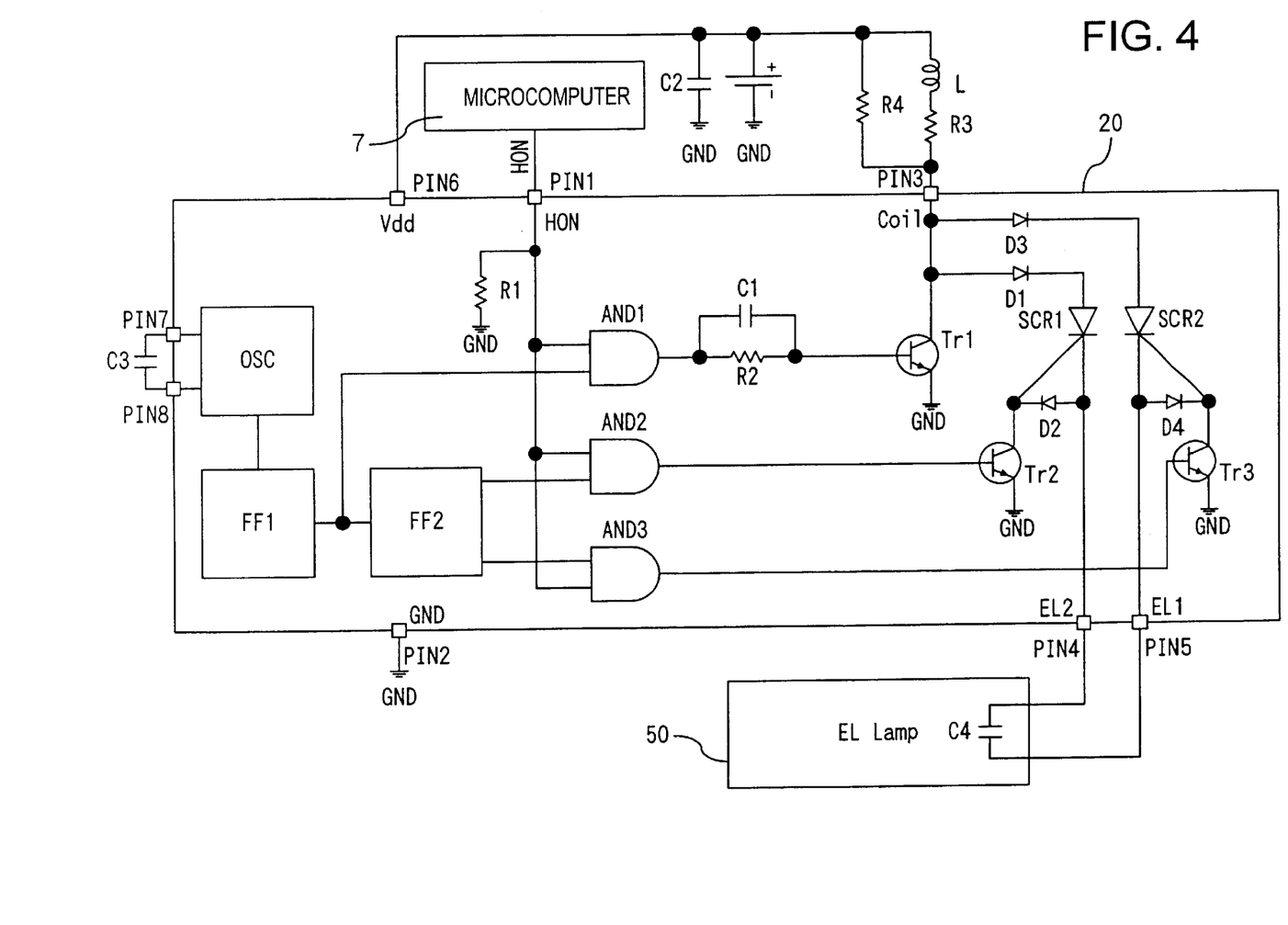
FIG. 4 is a circuit diagram of an EL driving circuit of Example 2 according to the invention.

FIG. 4 is a circuit diagram of an EL driving circuit of Example 2 for carrying out the invention. The EL driving circuit is arranged that an IC chip 20 applies voltage supplied through a coil L and a resister R3 by a control signal Hon from a microcomputer 7, which generates a signal for controlling to turn on and off an EL device, to the EL element 50 to drive. In explanation below, the same numerical labels and signs are indicated to explain in the same case as the conventional configuration or Example 1 for carrying out the invention.

In the IC chip 20, main circuits such as an oscillating circuit OSC, flip-flops FF1 and FF2 as a dividing circuit and a switched H-bridge circuit are provided. The IC chip 20 is provided with terminals (PAD) of PINs 1 to 8 connected to each circuit.

The oscillating circuit OSC is connected to a capacitor C3 through the PIN7 and PIN8 and connected to the flip-flop FF1 inside the IC chip 20. The oscillating circuit OSC generates a high frequency clock and outputs the clock to the flip-flop FF1.

The flip-flop FF1 outputs its output to the flip-flop FF2 and one of input terminals of an AND circuit 1 described below (hereinafter referred to as "AND1").

The flip-flop FF2 generates a lower frequency clock compared with the higher frequency clock inputted to an input terminal of the AND1. The flip-flop FF2 makes the two low frequency clocks in reversal phase each other to output them to one of input terminals of an AND circuit 2 described below (hereinafter referred to as "AND2") and one of input terminals of an AND circuit 3 described below (hereinafter referred to as "AND3") respectively.

The switched H-bridge circuit is constituted by main elements such as ANDs 1, 2 and 3, transistors Tr1, Tr2 and Tr3, diodes D1 to D4 and thyristors SCR1 and SCR2, and those elements are connected as described below.

One of input terminals of ANDs 1, 2 and 3 are connected to the PIN1 respectively. The control signal Hon from the microcomputer not to be shown is connected to the PIN1.

The PIN6 is a power supply terminal Vdd of the IC chip 20 and connected to a positive electrode Vdd of a power supply such as a battery and the like. The PIN2 is a power supply terminal GND of the IC chip 20 and connected to a negative electrode of the power supply such as the battery and the like. And the PIN2 and PIN6 are connected Vdd and GND in an inner circuit of the IC to supply electric power respectively. The capacitor C2 is connected to the PIN2 and PIN6 outside the IC to operate as an electrolytic compensating capacitor. Wiring between the other input terminals of ANDs 1,2, and 3 and the PIN1 is connected to a pull-down resister R1 connected to the GND.

On the other hand, an output terminal of the AND1 is connected to a base of the transistor Tr1 through a capacitor C1 and a resistor R2. The capacitor C1 and the resistor R2 are connected in parallel. An output terminal of the AND2 is connected to abase of the transistor Tr2, and an output terminal of the AND3 is connected to a base of the transistor Tr3.

A collector side of the transistor Tr1 is connected to the PIN3. Between the PIN3 and the positive electrode Vdd of the power supply, the resister R3 and the coil L are connected in series, and a resister R4 and them are connected in parallel outside the IC. That is to say, the resister R4 is connected to both ends of the series-connected coil L and resistor R3. Anodes of the diodes D1 and D3 are connected to wiring between the transistor Tr1 and the PIN3.

When the EL element is turned off, the resistor R4 forms a closed circuit with the coil L and the resistor R3. This causes pulsating voltage of the coil L to be consumed as Joule heat by the resistors R4 and R3. As a result, the electromagnetic wave created from the coil L can be reduced.

A cathode of the diode D1 is connected to an anode of the thyristor SCR1. A gate of the thyristor SCR1 is connected to a collector of the transistor Tr2. A cathode of the thyristor SCR1 is connected to the PIN4 and an anode of the diode D2. A cathode of the diode D2, like the gate of the thyristor SCR1, is connected to the collector of the transistor Tr2.

A cathode of the diode D3 is connected to an anode of the thyristor SCR2. A gate of the thyristor SCR2 is connected to a collector side of the transistor Tr3. A cathode of the thyristor SCR2 is connected to the PIN5 and an anode of the diode D4. A cathode of the diode D4, like the gate of the thyristor SCR2, is connected to the collector of the transistor Tr3.

Emitter sides of the transistors Tr1, Tr2 and Tr3 are connected to the GND respectively. The PIN4 and PIN5 are connected to a capacitor C4 which is a equivalent circuit of the EL element 50.

Operation in case of turning off an EL light of the above described configuration of the EL driving circuit according to Example 2 of the invention is explained below. Operation of turning on the EL light is omitted to explain because of the same as the conventional case.

When the EL light is turned on, the microcomputer 7 switches the signal Hon from a high state to a low state to turn off the transistor Tr1. This causes the resistor R4 to form the closed circuit with the coil L and the resistor R3, which permits pulsating voltage of the coil L to be consumed as Joule heat by the resistors R4 and R3. As a result, the electromagnetic wave created from the coil L can be reduced.

Therefore, according to Example 2, even in a period of time when voltage generated in case of turning off the EL element is higher than the rating Vces, energy of the counter electromotive force generated by the coil L can be absorbed. As a result, error of the microcomputer can be prevented.

EXAMPLE 3

Figure 5:
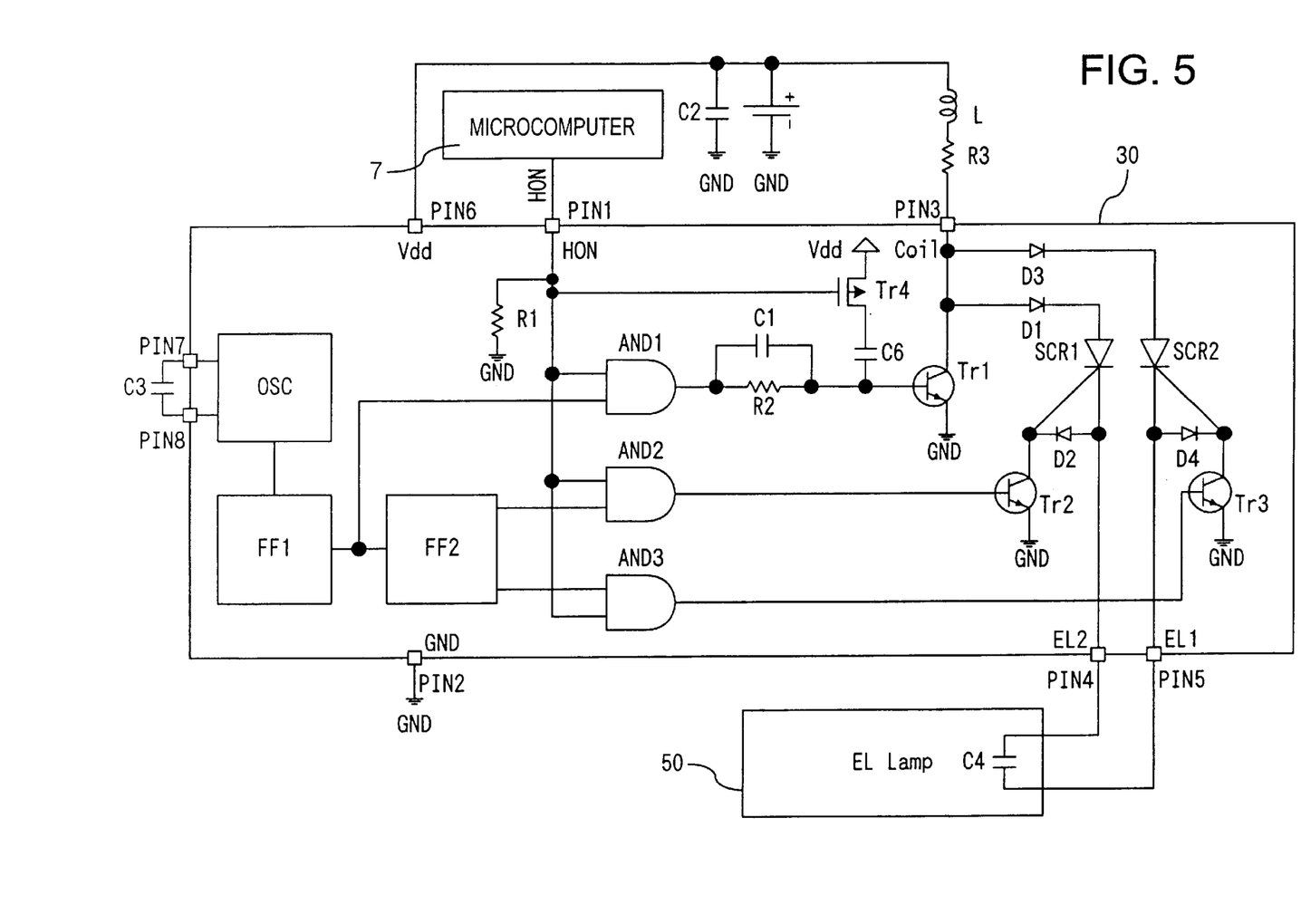
FIG. 5 is a circuit diagram of an EL driving circuit of Example 3 according to the invention.

FIG. 5 is a circuit diagram of an EL driving circuit of Example 3 for carrying out the invention. The EL driving circuit is arranged that an IC chip 30 applies voltage supplied through a coil L and a resister R3 by a control signal Hon from a microcomputer 7, which generates a signal for controlling to turn on and off an EL device, to the EL element 50 to drive. In explanation below, the same numerical labels and signs are indicated to explain in the same case as the conventional configuration or Examples 1 and 2.

In the IC chip 30, main circuits such as an oscillating circuit OSC, flip-flops FF1 and FF2 as a dividing circuit and a switched H-bridge circuit are provided. The IC chip 30 is provided with terminals (PAD) of PINs 1 to 8 connected to each circuit.

The oscillating circuit OSC is connected to a capacitor C3 through the PIN 7 and PIN8 and connected to the flip-flop FF1 inside the IC. The oscillating circuit OSC generates a higher frequency clock and outputs the clock to the flip-flop FF1.

The flip-flop FF1 outputs its output to the flip-flop FF2 and one of input terminals of an AND circuit 1 described below (hereinafter referred to as "AND1").

The flip-flop FF2 generates a lower frequency clock compared with the higher frequency clock inputted to an input terminal of the AND1. The flip-flop FF2 makes the two low frequency clocks in reversal phase each other to output them to one of input terminals of an AND circuit 2 described below (hereinafter referred to as "AND2") and one of input terminals of an AND circuit 3 described below (hereinafter referred to as "AND3") respectively.

The switched H-bridge circuit is constituted by main elements such as ANDs 1, 2 and 3, transistors Tr1, Tr2 and Tr3, diodes D1 to D4 and thyristors SCR1 and SCR2, and those elements are connected as described below.

The other input terminals of the ANDs 1, 2 and 3 are connected to the PIN1 respectively. The control signal Hon from the microcomputer not to be shown is connected to the PIN1.

The PIN6 is a power supply terminal vdd of the IC chip 30 and connected to a positive electrode Vdd of a power supply such as a battery and the like. The PIN2 is a power supply terminal GND of the IC chip 30 and connected to a negative electrode of the power supply such as the battery and the like. And the PIN2 and PIN6 are connected Vdd and GND in an inner circuit of the IC to supply electric power respectively. A capacitor C2 is located outside the IC and connected to the PIN2 and PIN6 to operate as an electrolytic compensating capacitor.

Wiring between the other input terminals of ANDs 1,2, and 3 and the PIN1 is connected to a pull-down resister R1 connected to the GND.

On the other hand, an output of the AND1 is connected to a base of the transistor Tr1 through a capacitor C1 and a resistor R2. The capacitor C1 and the resistor R2 are connected in parallel. And the base of the transistor Tr1 is connected to one of electrodes of a capacitor C5. The other electrode of the capacitor C5 is connected to a drain of a transistor Tr4. A gate terminal of the transistor Tr4 is connected to wiring between inputs of ANDs 1 to 3 and the PIN1. A source of the transistor Tr4 is connected to the power supply terminal Vdd (PIN6).

An output of the AND2 is connected to a base of the transistor Tr2, and an output of the AND3 is connected to a base of the transistor Tr3.

A collector side of the transistor Tr1 is connected to the PIN3. Between the PIN3 and the positive electrode Vdd of the power supply, the resister R3 and the coil L are connected in series outside the IC. Anodes of the diodes D1 and D3 are connected to wiring between the transistor Tr1 and the PIN3.

A cathode of the diode D1 is connected to an anode of the thyristor SCR1. A gate of the thyristor SCR1 is connected to a collector of the transistor Tr2. A cathode of the thyristor SCR1 is connected to the PIN4 and an anode of the diode D2. A cathode of the diode D2, like the gate of the thyristor SCR1, is connected to the collector of the transistor Tr2.

A cathode of the diode D3 is connected to an anode of the thyristor SCR2. A gate of the thyristor SCR2 is connected to a collector side of the transistor Tr3. A cathode of the thyristor SCR2 is connected to the PIN5 and an anode terminal of the diode D4. A cathode of the diode D4, like the gate of the thyristor SCR2, is connected to the collector of the transistor Tr3.

Each emitter of the transistors Tr1, Tr2 and Tr3 is connected to the GND respectively. And the PIN4 and PIN5 are connected to a capacitor C4 which is a equivalent circuit of the EL element 50.

Operation in case of turning off an EL light of the above described configuration of the EL driving circuit according to Example 3 is explained below. Operation of turning on the EL light is omitted to explain because of the same as the conventional case. The transistor Tr4 is turned off because voltage is applied to the gate. This causes the capacitor C6 not to operate electrically in case of turning on the EL light 50.

When the EL light is turned on, a microcomputer 7 switches the signal Hon from a high state to a low state, which causes a gate voltage of the transistor Tr4 to become from H to L to turn on the transistor Tr4. And when an output of AND1 becomes low, charging current flows to the capacitor C6. This allows voltage drop applied to the base of the transistor Tr1 to become gently. As a result, collector current, that is to say, change of current flowing to the coil L becomes small.

Therefore, according to the above described Example 3 for carrying out the invention, because the change of current flowing to the coil L becomes small even in the same period of time as the conventional case that voltage generated in case of turning off the EL light is higher than the rating Vces, voltage of the coil L can be suppressed below the rating Vces. As a result, error of the microcomputer can be prevented.

Transistors which perform the same switching operation as each transistor explained in each of the above Examples may be usable without sorts such as npn type, pnp type and the like. In each of the above Examples, though explanation is described in case that the EL element is an EL element, the EL element can be applied to not only an element but also an EL display apparatus which displays characters, image and so on.

As explained above, according to the invention, it is possible to provide an EL driving circuit which suppresses counter electromotive force of a coil generated by rapid voltage fluctuation in case of turning off an EL element, eliminates creation of noise from the coil, and in turn prevents error of a microcomputer due to the noise.

What is claimed is:

1. An electroluminescent (hereinafter referred to as "EL") driving circuit comprising:

an EL element, a voltage set-up coil which generates pulsating voltage for turning on the EL element, an oscillating circuit for generating a reference signal, a dividing circuit for dividing a clock generated by the oscillating circuit into at least two kinds of frequency clocks, a first switching circuit for switching current which flows the voltage set-up coil by a higher frequency clock of the two kinds of frequency clocks divided by the dividing circuit, a second switching circuit for switching polarity of voltage applied to the EL element by a lower frequency clock of the two kinds of frequency clocks, a control circuit for switching connection between the dividing circuit and the first switching circuit, and connection between the dividing circuit and the second switching circuit at the same time by a control signal which turns on and off the EL element, and a suppressing circuit for suppressing a counter electromotive force created in case of turning off the EL element below withstanding voltage of the first switching circuit.

2. An EL driving circuit as claimed in claim 1, wherein the suppressing circuit includes a first delay circuit constituted by a combination of a resistor and a capacitor, and the first delay circuit is arranged at a forestep of the control circuit, and input voltage of the delay circuit is switched from a high state to an open state in case that the control signal turning of the EL element is inputted to the delay circuit.

3. An EL driving circuit as claimed in claim 1, wherein the suppressing circuit includes a resistor connected in parallel to the voltage set-up coil, and suppresses the counter electromotive force in case of turning off the EL element.

4. An EL driving circuit as claimed in claim 1, wherein the suppressing circuit includes a second delay circuit constituted by a combination of a resistor, a capacitor and a third switching circuit, and in the second switching circuit, the third switching circuit turns on in case of turning off the EL element.

5. An EL driving circuit as claimed in claim 1, wherein a signal generating circuit for generating a signal which controls turning on and off the EL element is provided, and the signal generating circuit generates the control signal which turns on and off the EL element.

6. An electronic apparatus comprising:

a power supply and an EL driving circuit as claimed in claim 1, wherein the EL driving circuit is driven by electric power of the power supply.

7. A control method comprising steps of:

generating a control signal which changes a high state to an open state for turning off the EL element, inputting the control signal to a delay circuit and decreasing a voltage of the delay circuit from a high state responsive to a time constant, generating an irregular pulse by the control circuit when the decreasing voltage of the delay circuit reaches to certain voltage to a threshold voltage of the control circuit, and releasing energy stored in a voltage set-up coil by a first switching element which turns on or off current through the voltage set-up coil according to the irregular pulse.

8. A control method as claimed in claim 7, wherein the time constant of the delay circuit is not lower than 10 microseconds and not more than 1 milliseconds.

9. A control method comprising steps of:

generating a control signal which changes a high state to a low state for turning off the EL element, starting delay operation by turning on a switch of a delay circuit when the control signal is inputted to the delay circuit, outputting a low signal to the delay circuit by the control circuit when the control signal is inputted to the control circuit, outputting a signal decreased according to a time constant of the delay circuit when the low signal is inputted to the delay circuit, and decreasing current of the voltage set-up coil by a first switching circuit according to the signal when the signal is inputted to the first switching circuit.

* * * * *